(12) United States Patent
Meinert

(10) Patent No.: US 7,806,458 B2
(45) Date of Patent: Oct. 5, 2010

(54) CONVERTIBLE VEHICLE WITH A COVER PART WHICH MAY OPEN IN TWO DIRECTIONS

(75) Inventor: Stefan Meinert, Wallenhorst (DE)

(73) Assignee: Wilhelm Karmann GmbH, Osnabruck (DE)

( * ) Notice: Subject to any disclaimer, the term of this patent is extended or adjusted under 35 U.S.C. 154(b) by 0 days.

(21) Appl. No.: 11/815,977

(22) PCT Filed: Feb. 2, 2006

(86) PCT No.: PCT/DE2006/000156

§ 371 (c)(1),
(2), (4) Date: Aug. 10, 2007

(87) PCT Pub. No.: WO2006/084434

PCT Pub. Date: Aug. 17, 2006

(65) Prior Publication Data

US 2009/0015039 A1    Jan. 15, 2009

(30) Foreign Application Priority Data

Feb. 10, 2005   (DE) .................. 10 2005 006 272

(51) Int. Cl.
*B60J 7/20* (2006.01)
*B62D 25/10* (2006.01)

(52) U.S. Cl. ............. 296/107.08; 296/76; 296/136.05

(58) Field of Classification Search ................ 296/76, 296/107.08, 136.05, 136.06
See application file for complete search history.

(56) References Cited

U.S. PATENT DOCUMENTS

| | | | |
|---|---|---|---|
| 5,823,606 A * | 10/1998 | Schenk et al. .......... | 296/107.08 |
| 6,193,300 B1 * | 2/2001 | Nakatomi et al. ....... | 296/107.08 |
| 6,250,707 B1 | 6/2001 | Dintner et al. | |
| 6,325,298 B1 * | 12/2001 | Hielm .................... | 237/12.3 R |
| 6,352,298 B1 | 3/2002 | Hayashi et al. | |
| 6,578,899 B2 | 6/2003 | Hasselgruber et al. | |
| 6,619,720 B2 * | 9/2003 | Nicastri ................. | 296/107.08 |
| 6,705,662 B2 * | 3/2004 | Sande ................... | 296/107.08 |
| 6,705,663 B2 * | 3/2004 | Zipperle ................ | 296/136.06 |
| 6,715,819 B2 * | 4/2004 | Weissmueller ......... | 296/107.08 |
| 6,799,788 B2 * | 10/2004 | Plesternings ........... | 296/107.08 |
| 6,824,194 B2 * | 11/2004 | Weissmueller et al. . | 296/136.05 |
| 6,899,368 B2 * | 5/2005 | Neubrand ............... | 296/76 |
| 7,004,529 B2 * | 2/2006 | Guillez et al. .......... | 296/76 |

(Continued)

FOREIGN PATENT DOCUMENTS

DE        10237148        3/2003

(Continued)

*Primary Examiner*—Glenn Dayoan
*Assistant Examiner*—Gregory Blankenship
(74) *Attorney, Agent, or Firm*—Gifford, Krass, Sprinkle, Anderson & Citkowski, P.C.; Douglas L. Wathen

(57) ABSTRACT

The invention relates to a motor vehicle with a roof or roof section which may be placed below a cover piece in the rear section of the vehicle, whereby the cover piece can be opened to provide a loading opening for luggage or a through opening for the roof. The cover piece is retained by at least one displacement mechanism in the vehicle, embodied such that the displacement mechanism, on at least one vehicle side, comprises a movement with only one degree of freedom for both opening directions of the cover piece.

20 Claims, 8 Drawing Sheets

U.S. PATENT DOCUMENTS

| | | | | |
|---|---|---|---|---|
| 7,032,952 B2 * | 4/2006 | Dilluvio | ................ | 296/107.08 |
| 7,128,361 B2 * | 10/2006 | Guillez et al. | .......... | 296/107.08 |
| 7,198,318 B2 * | 4/2007 | Dilluvio | ................ | 296/107.08 |
| 7,201,428 B2 * | 4/2007 | Wagner | ................. | 296/107.08 |
| 7,204,542 B2 * | 4/2007 | Queveau et al. | ........ | 296/107.08 |
| 7,237,822 B2 * | 7/2007 | Queveau et al. | ........ | 296/107.08 |
| 7,357,437 B2 * | 4/2008 | Kuhr | ........................... | 296/76 |
| 7,377,573 B2 * | 5/2008 | Queveau et al. | ........ | 296/107.08 |
| 7,392,873 B2 * | 7/2008 | Habacker | ................... | 180/69.2 |
| 7,497,497 B2 * | 3/2009 | Vogt | ....................... | 296/107.08 |
| 7,604,283 B2 * | 10/2009 | Brockhoff et al. | ...... | 296/107.08 |
| 7,686,377 B2 * | 3/2010 | Brockhoff | .............. | 296/107.08 |
| 2002/0109372 A1 * | 8/2002 | Weissmueller | ......... | 296/107.08 |
| 2003/0218354 A1 * | 11/2003 | Plesternings | ........... | 296/107.08 |
| 2005/0046221 A1 * | 3/2005 | Guillez et al. | ................. | 296/76 |
| 2006/0163907 A1 * | 7/2006 | Queveau et al. | ........ | 296/107.08 |
| 2006/0186694 A1 * | 8/2006 | Wagner | ................. | 296/107.08 |
| 2007/0029833 A1 * | 2/2007 | Kuhr | ........................... | 296/76 |
| 2007/0108793 A1 * | 5/2007 | Schumacher et al. | ... | 296/107.08 |

FOREIGN PATENT DOCUMENTS

| | | |
|---|---|---|
| DE | 10322980 | 12/2003 |
| FR | 2846604 | 5/2004 |

* cited by examiner

CONVERTIBLE VEHICLE WITH A COVER PART WHICH MAY OPEN IN TWO DIRECTIONS

REFERENCE TO RELATED APPLICATIONS

This application is the United States national phase application of PCT/DE2006/000156, filed Feb. 2, 2006, which claims priority to German Patent Application No. DE102005006272.5, filed Feb. 10, 2005, the entire content of each application is incorporated herein by reference.

FIELD OF THE INVENTION

The invention relates to a motor vehicle comprising a roof or roof portion which can be stowed underneath a cover part, in particular to a convertible vehicle, wherein the cover part is capable of opening in two different movement procedures.

BACKGROUND OF THE INVENTION

A convertible vehicle is known from DE 44 45 944 C1 which provides a cover part to be opened in two oppositely directed movement procedures to provide a passage opening for the roof, on the one hand, and to provide a loading opening for baggage, on the other hand, depending on the direction of opening. The cover part is attached to a rearward auxiliary frame which in turn pivots around an axis close to the tail to realize a first direction of movement and remains unpivoted to realize a second direction of movement, while multijoints attached to the auxiliary frame open. A construction of this type requires a high construction effort with a plurality of pivot points. The cover part moreover pivots around an axis associated with its rear lock on the release of the passage openings for the roof, which restricts the design options of the vehicle tail.

It is the underlying problem of the invention to improve a motor vehicle of the named kind with respect to the opening mechanism of its cover part.

SUMMARY OF THE INVENTION

According to one aspect of the invention, a motor vehicle includes an improved convertible roof design, in which a roof part is stowable in a rearward vehicle portion beneath a cover part, wherein the cover part can be selectively opened in one direction to provide a loading opening for baggage or in another direction to provide a passage opening for the roof part. The movement is provided by at least one movement mechanism in the vehicle, wherein the movement mechanism includes a transmission at least at one vehicle side having only one degree of freedom for both directions of opening of the cover part. By this arrangement, both oppositely directed opening movements of the cover part can thus be effected using the same transmission. No separate joint arrangements are required to form the passage opening for the roof, on the one hand, and to form the loading opening for baggage, on the other hand. The total construction is thus substantially simplified and the space requirements in the vehicle and the number of pivot points, as well as the control effort are minimized. Neither an auxiliary frame nor any other blocking of some of the joints required for one of the directions of movement is necessary to reduce the number of the degrees of freedom of the transmission.

Provided a central drive member for the movement out of the closed position can be pivoted out in two directions, a single drive can be used, for example an electrically movable spindle, for both directions of opening without switching over. The control of the movement is thereby very simple. The only one rotation possibility in two directions simplifies the total construction.

When the drive member can be rotated around a rotary axle disposed transversely to the vehicle, the drive can be arranged, for example, vertically behind the rear wheelhouse in a space-saving manner and while utilizing body spaces already present.

A formation of a central triangular member which is held rotatably on the rotary axle and which carries spaced apart therefrom two joints for two drive members of the cover part movement can, on a deflection out of the neutral position, exert a shear force on both drive members simultaneously and achieves a fast and effective movement of the cover part in the one or the other direction.

It is moreover particularly advantageously possible that drive members pivoting on an opening of the cover at least nearly intersect and that therefore an external introduction of force onto these drive members, for instance by a violent attempt to open the cover part, does not exert any torque around the rotary axle and the closed position is, thereby, secured. The number of locks can thus be minimized.

Provided that the transmission is deflected at one extreme angular position when the cover part is opened to form the passage opening for the roof and is deflected at another extreme angular position when the cover part is opened to form the loading opening for baggage, the opening angles can be bounded by adjustable abutments and thus be adjustable. A drive can then only travel in one direction between both different open positions, with the neutral position with a closed cover part being able to represent a simple intermediate position of the drive.

A connection of the cover part in every direction of movement to the body only via the transmission or transmissions makes further retaining parts such as auxiliary frames or the like completely superfluous.

A particular advantage can be achieved it during the opening to form the passage opening for the roof, the cover part can be raised overall such that its rear end does not fall below its height when closed. A tail design, in particular a bumper, used with a closed version of the vehicle type can be used unchanged, without a recess having to be provided there for the lowering rear part of the cover part. This saves substantial conversion costs.

The joints of the transmission can be of different kinds and be formed, for instance, as pivot joints, sliding joints or cam joints.

BRIEF DESCRIPTION OF THE DRAWINGS

Advantages of the present invention will be readily appreciated as the same becomes better understood by reference to the following detailed description when considered in connection with the accompanying drawings, wherein.

DETAILED DESCRIPTION OF THE INVENTION

Figure 1:
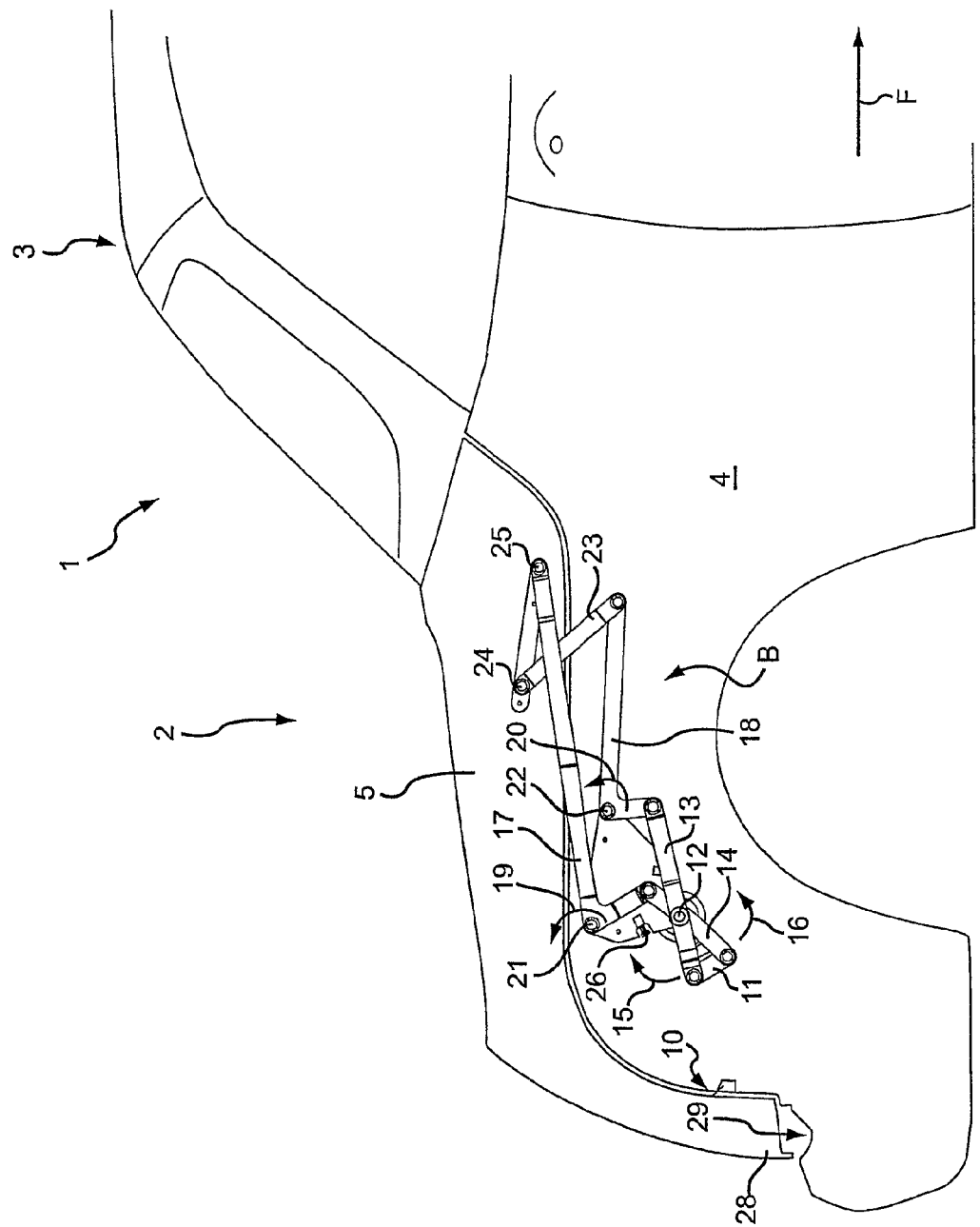
FIG. 1 is a lateral schematic view of a tail region of a convertible vehicle in accordance with the invention in a closed position of the cover part.

In FIG. 1, a tail region 2 of a motor vehicle designated in total by 1 is shown with a roof 3 which is capable of at least partially opening or capable of opening completely. It can partly or fully include rigid parts or also be provided with a flexible top continuously outside a rear window. The roof 3 can be stowed in a top storage well (not shown) beneath a moving decklid or cover part 5 in the body 4 for its opening.

The cover part 5 can be opened in two oppositely directed movements from a closed position in accordance with FIG. 1.

Figure 2:
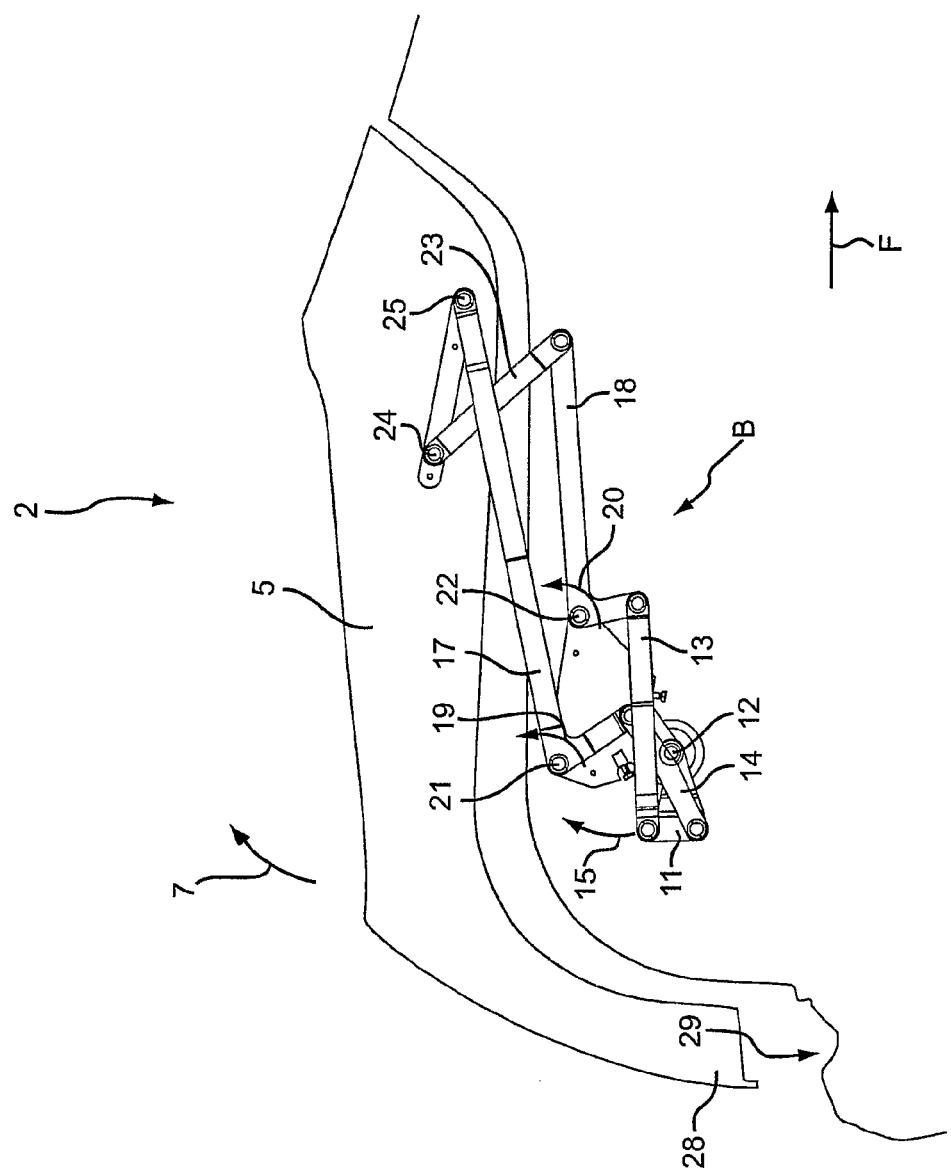
FIG. 2 is a similar view of only the cover part and of the associated movement mechanism as in FIG. 1 during the starting opening of the cover part for the release of a loading opening for baggage.
Figure 3:
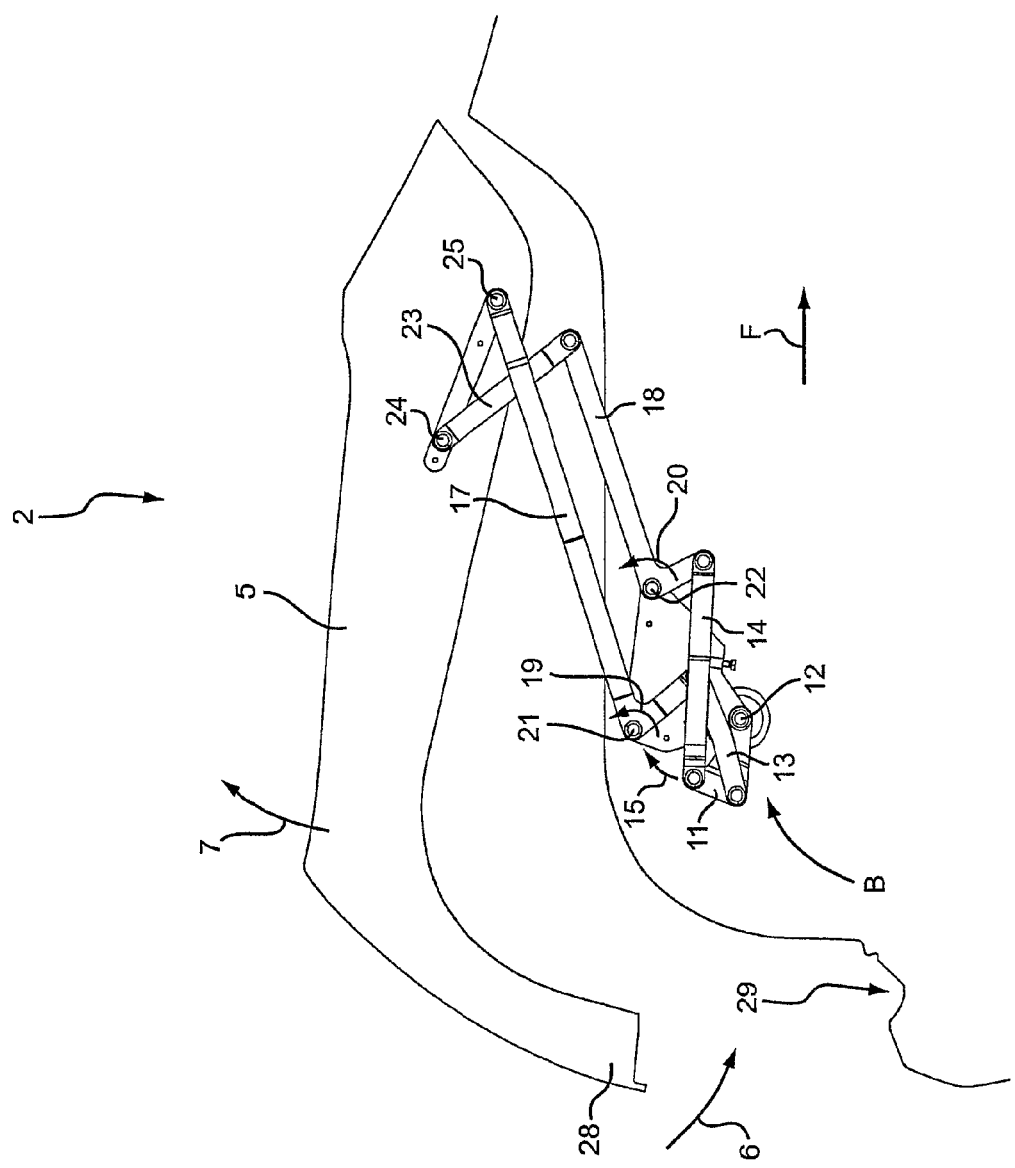
FIG. 3 is a similar view to FIG. 2 with a further progressing opening of the roof part.
Figure 4:
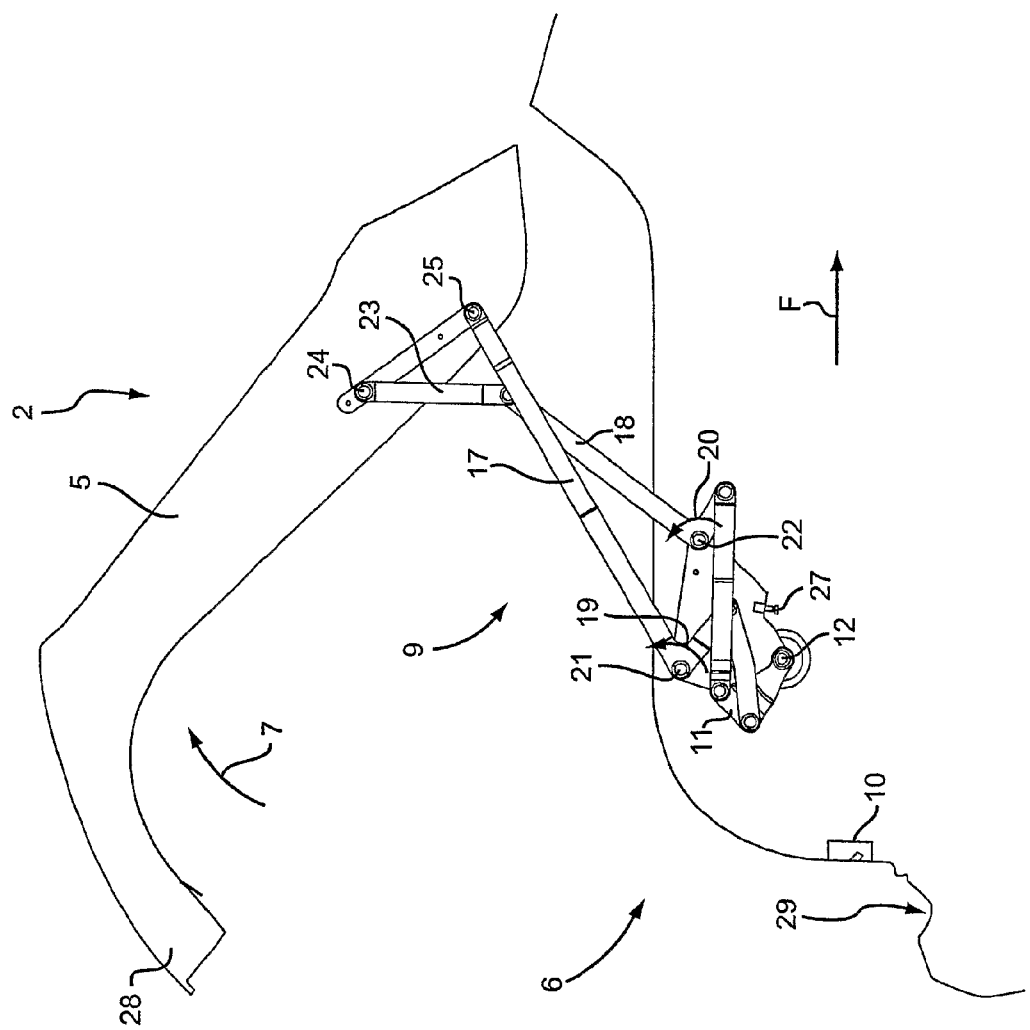
FIG. 4 is a similar view to FIG. 3 with a completely open cover part for the release of the loading opening for baggage.
Figure 5:
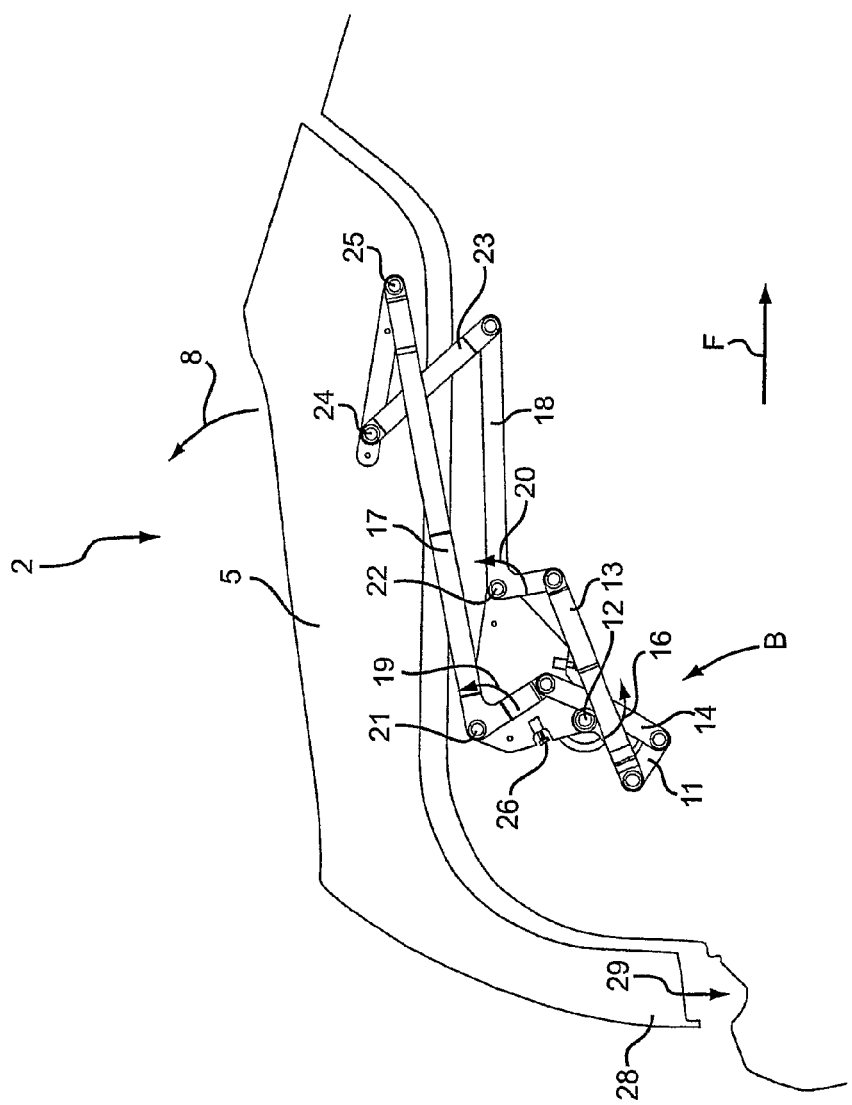
FIG. 5 is a similar view of the tail region as in FIG. 2, but with a starting opening of the cover part in the opposite direction thereto for the release of the passage opening for the roof.
Figure 6:
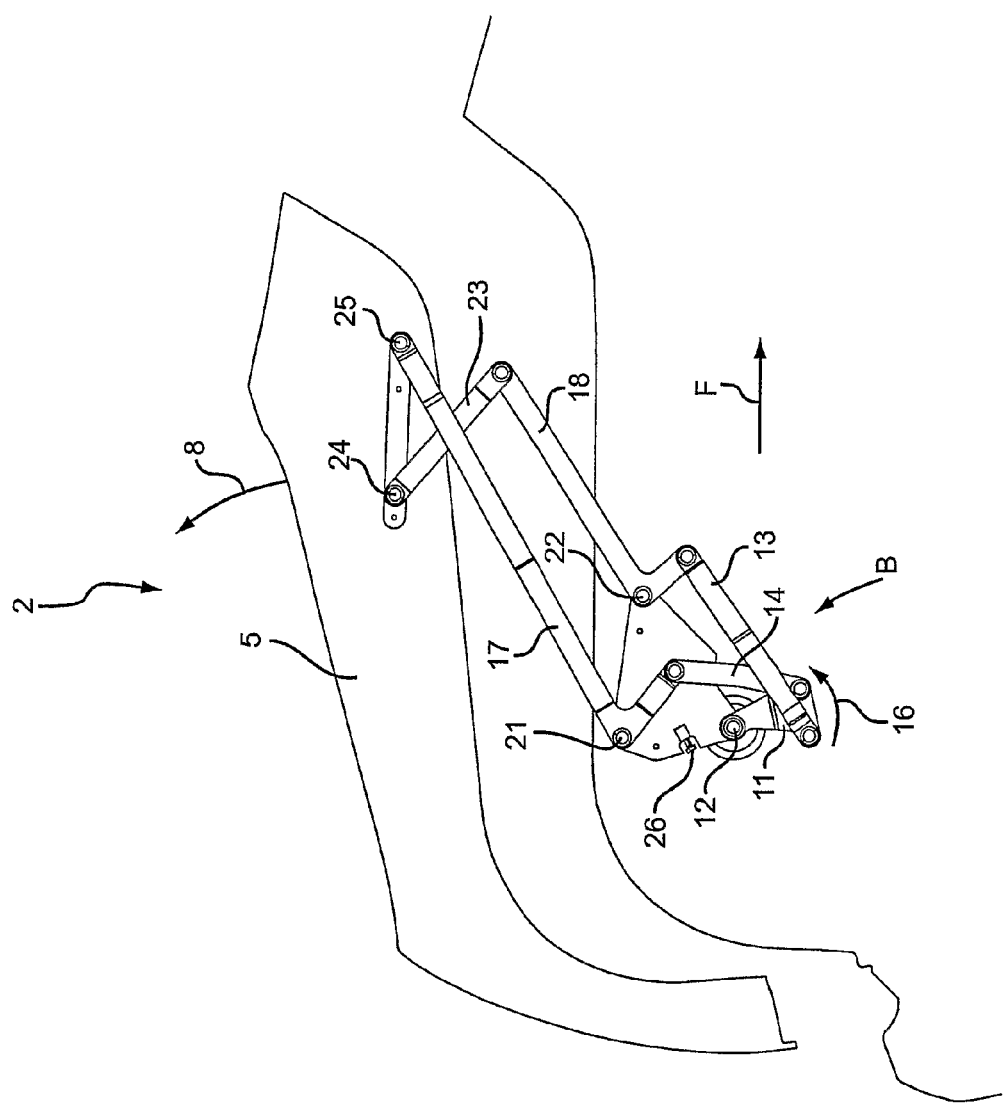
FIG. 6 is a similar view of the cover part and of the associated movement mechanism as in FIG. 5 on a further progressing opening of the cover part for the release of the passage opening for the roof.
Figure 7:
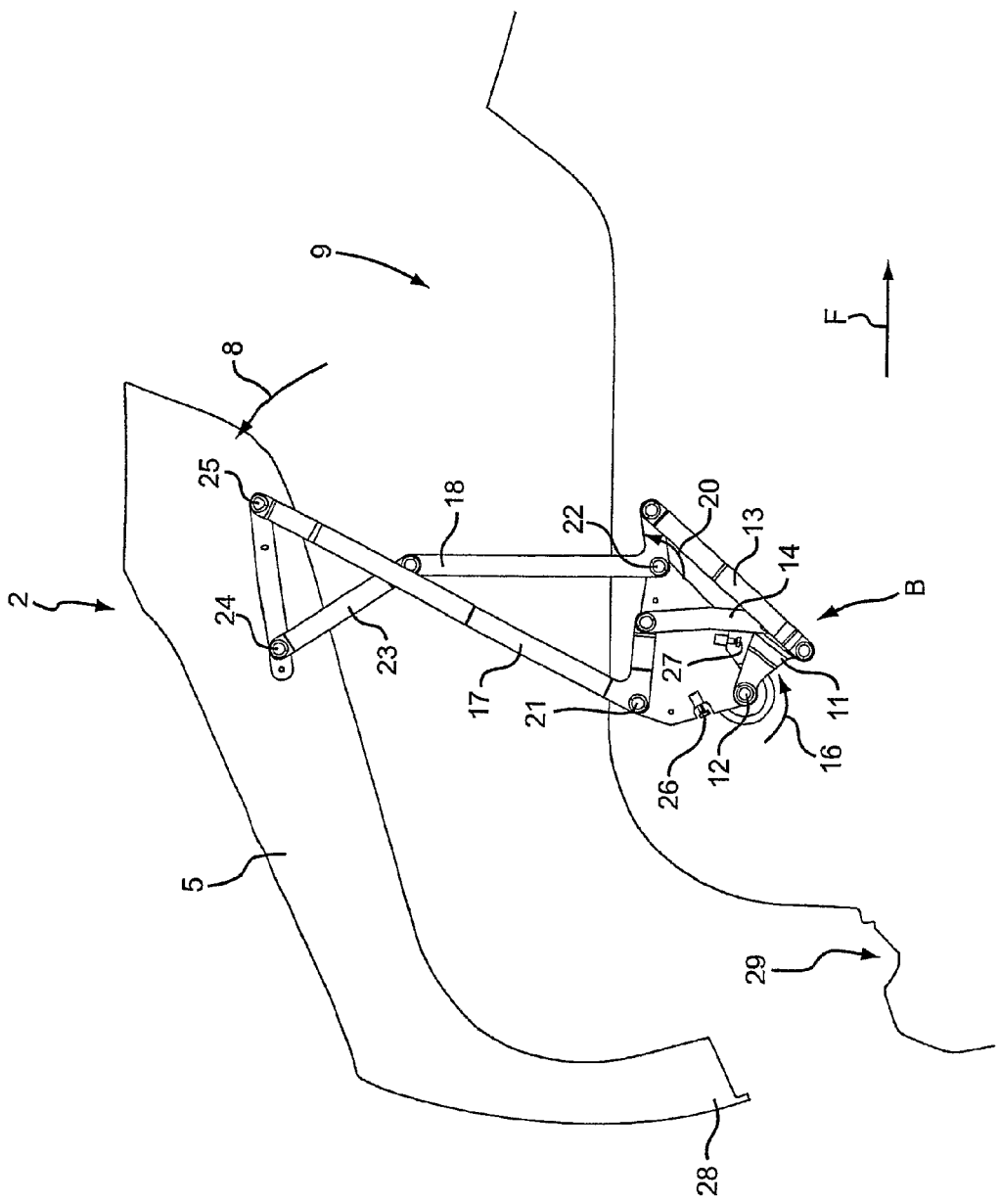
FIG. 7 is a similar view to FIG. 6 with a further progressing opening of the cover part for the release of the passage opening for the roof.

To permit opening of the cover part 5 in one direction to form a loading opening 6 for baggage, the cover part 5 can be pivoted in the direction of the arrow 7, as shown in FIGS. 2-4, and can be pivoted back opposite the arrow 7 for closing the cover part 5.

Furthermore, the cover part 5 can be opened in an opposite direction of movement to form a passage opening 9 for the roof 3 in the direction of the arrow 8, as shown in FIGS. 5-8, and can be closed against this direction.

To make these two opening and closing movements possible, the cover part 5 is movably held at least at one longitudinal vehicle side, usually at both, at the body 4 in each case at a movement mechanism generally indicated at B via a transmission having only one transmission degree of freedom. The movement mechanism B can be inserted in modular form into the body 4 together with the cover part 5 in the assembly process.

In the closed state, the cover part 5 is additionally held at a tail-side lock 10 into which it can automatically latch on closing and which is, for example, remotely triggerable electrically for opening.

The transmission can be driven by a main member 11 which is made as a triangular member and is movably held on an axle 12 extending transversely to the vehicle and having only one rotational degree of freedom. Two drive members 13, 14 are pivotably movably arranged spaced from the axle 12 at the triangular member 11 and cross the rotary axle 12 at a dead-center position with a closed cover part 5 so that a pulling force onto one of these drive members 13, 14 by an attempt to open the cover part 15 externally cannot lead to a resulting torque of the main member 11 around the axle 12. Enhanced security of the corner part 5 in the closed state is hereby achieved. No further lock is therefore needed. Optionally, at least one tail cover lock 10 can be provided for the compensation of any tolerances and elasticities in the material.

To open the cover part 5 from the closed position (FIG. 1) in the first direction of movement in the direction of the arrow 7 to form the loading opening 6 for baggage (FIG. 2 to FIG. 4), the triangular member 11 is pivoted in the direction of the arrow 15 around the axle 12. The member 11 is pivoted by a drive member (not shown), for example a hydraulic cylinder, an electrically driven spindle, a belt drive or another drive member to be arranged easily in the body depending on the space conditions so that the drive members 13 and 14 are moved out of the dead-center position. A sliding force is exerted onto the positioning levers 17, 18 so that they are pivoted around their joints 21, 22 fixed to the body with different transmissions in the direction of the arrows 19, 20. The front positioning lever 18 passes through a larger angular range in this process. A deflecting intermediate lever 23 connects the front positioning lever 18 to the linkage 24 further to the rear than the positioning lever 17 is connected to the cover part 5 by linkage 25. Therefore, the rear end of the cover is raised more than its front end (FIG. 4).

At the end of the rotary movement in the direction of the arrow 15, an extreme angular position is reached at which the triangular member 11 contacts an adjustable abutment 26 which bounds the opening angle of the cover part 5 FIG. 4).

In contrast, to open the cover part 5 from the neutral position (FIG. 1) in the second direction (arrow 8) to open the passage opening 9 for the roof 3 (FIG. 5 to FIG. 8), the triangular member 11 is rotated out of its neutral position (FIG. 1) in the opposite direction to the first cover part opening described above. The member 11 is rotated in the direction of the arrow 16, with the drive members 13 and 14 being taken along. The positioning levers 17, 18 acted on by the drive members 13, 14 are, in turn, rotated in the direction of the arrows 19, 20. However, this time, due to the changed direction of rotation of the triangular member 11, the different transmissions act such that the cover part 5 is first raised almost parallel and at the end of its movement (transition from FIG. 7 to FIG. 8) the intermediate lever 23 kinks with respect to the positioning lever 18 and thus the rear end of the cover part is transposed downwardly.

Figure 8:
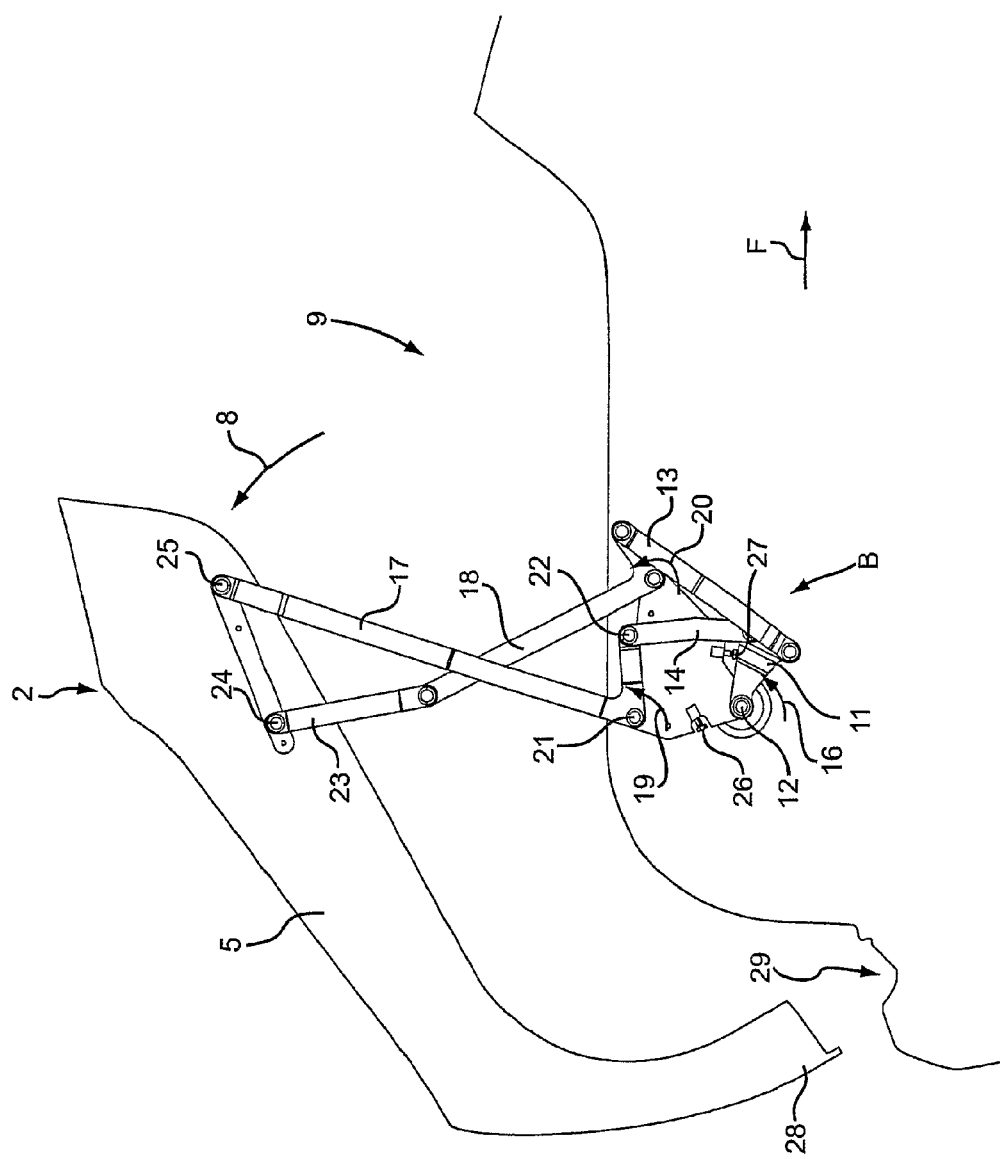
FIG. 8 is a similar representation of the cover part in a fully open position for the release of the passage opening for the roof.

At the end of the rotary movement in the direction of the arrow 16, an extreme angular position is reached opposite to the above movement at which the triangular member 11 contacts an adjustable abutment 27 which bounds the opening angle of the cover part 5 (FIG. 8).

The transmission here includes, for example, a total of ten joints, with only the two joints 21, 22 as well as the central pivot joint 12 being arranged fixed to the body and the joints 24, 25 being arranged fixed to the cover part 5. All the joints are in co-movement during the movement of the cover part; no joint is blocked, for example by being held fast in a lock.

A particular advantage is the fact that the rear end 28 of the cover part 5 also does not fall below its height when it is closed, during an initial raising movement of the cover part 5 toward the rearwardly tilted release position of the passage opening 9 for the roof 3 so that the notch 29 into the bumper drawn here is not necessary. The bumper or other body part can rather be formed in the same way as with a vehicle with a closed structure, which saves substantial costs.

The cover part 5 is only held to the body 4 via the transmission or transmissions in every phase of the movement so that further linkage parts can be omitted and the design can therefore be performed simply and with a low weight. The tail lock 10 only serves for latching and does not have any carrying function; the cover part 5 is in particular not rotated around it.

The cover part 5 is movable so as to apply a downward pressure with a high force during its closing. Thus, a good sealing property of a seal extending beneath the cover part 5 is thereby achieved.

Overall, the transmission encompassed by the movement mechanism 9 has only a mechanically determined possibility of the movement procedure of all joints so that the transmission has only one degree of freedom for every opening or closing position of the cover part 5.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

The invention claimed is:

1. A motor vehicle comprising:
    a cover part;
    a roof or roof part stowable in a rearward vehicle portion beneath the cover part,
    a movement mechanism operatively coupled between a body of the motor vehicle and the cover part for selective movement of the cover part in one direction to form a loading opening to receive baggage therethrough and in an opposite direction to form a passage opening to receive the roof or roof part therethrough when stowed in the rearward vehicle portion,
    wherein the movement mechanism includes a transmission disposed at least at one vehicle side, the movement mechanism having only one degree of freedom for both directions of opening movement of the cover part.

2. A motor vehicle comprising:
    a cover part;
    a roof or roof part stowable in a rearward vehicle portion beneath the cover part,
    a movement mechanism operatively coupled between a body of the motor vehicle and the cover part for selective movement of the cover part in one direction to form a loading opening to receive baggage therethrough and in an opposite direction to form a passage opening to receive the roof or roof part therethrough when stowed in the rearward vehicle portion,
    wherein the movement mechanism includes a transmission disposed at least at one vehicle side and having only one degree of freedom for both directions of opening movement of the cover part, the transmission including a main member which is movable out of a closed position of the cover part in two oppositely directed pivot directions and, depending on its pivot direction, provides movement of the cover part to form the passage opening for the roof or roof part or the loading opening for baggage.

3. A motor vehicle as set forth in claim 2, wherein the transmission includes a rotary axle disposed transversely to the vehicle.

4. A motor vehicle as set forth in claim 3, wherein the transmission has a main member which is rotatably held on the rotary axle and which carries spaced apart herefrom two joints for two drive members of the cover part movement.

5. A motor vehicle as set forth in claim 4, wherein during movement of the cover part to form the passage opening for the roof, the transmission is deflected into one extreme angular position and during movement to form the loading opening for baggage, it is deflected in another extreme angular position.

6. A motor vehicle as set forth in claim 5, wherein the transmission is held in a neutral position between the extreme angular positions with a closed cover part.

7. A motor vehicle as set forth in claim 6, wherein drive members pivoting on the opening of the cover part at least almost intersect the rotary axle in the neutral position.

8. A motor vehicle comprising:
    a cover part;
    a roof or roof part stowable in a rearward vehicle portion beneath the cover part,
    a movement mechanism operatively coupled between a body of the motor vehicle and the cover part for selective movement of the cover part in one direction to form a loading opening to receive baggage therethrough and in an opposite direction to form a passage opening to receive the roof or roof part therethrough when stowed in the rearward vehicle portion,
    wherein the movement mechanism includes a transmission disposed at least at one vehicle side and having only one degree of freedom for both directions of opening movement of the cover part;
    the cover part being held at the body only via the transmission in every movement phase.

9. A motor vehicle comprising:
    a cover part;
    a roof or roof part stowable in a rearward vehicle portion beneath the cover part,
    a movement mechanism operatively coupled between a body of the motor vehicle and the cover part for selective movement of the cover part in one direction to form a loading opening to receive baggage therethrough and in an opposite direction to form a passage opening to receive the roof or roof part therethrough when stowed in the rearward vehicle portion,
    wherein the movement mechanism includes a transmission disposed at least at one vehicle side and having only one degree of freedom for both directions of opening movement of the cover part; and
    wherein during movement of the cover part to form the passage opening for the roof, the cover part can be raised overall such that its rear end does not fall below its height when the cover part is closed.

10. A motor vehicle comprising:
    a cover part;
    a roof or roof part stowable in a rearward vehicle portion beneath the cover part,
    a movement mechanism operatively coupled between a body of the motor vehicle and the cover part for selective movement of the cover part in one direction to form a loading opening to receive baggage therethrough and in an opposite direction to form a passage opening to receive the roof or roof part therethrough when stowed in the rearward vehicle portion,
    wherein the movement mechanism includes a transmission disposed at least at one vehicle side and having only one degree of freedom for both directions of opening movement of the cover part;
    the cover part being latched only via a tail side lock in the closed position.

11. A motor vehicle comprising:
    a cover part for covering a stowage space while the cover part is in a closed position;
    a convertible top movable between an extended position extending over a passenger compartment in the vehicle and a retracted position retracted into the stowage space beneath the cover part in the closed position; and
    a movement mechanism operatively coupled between the cover part and a body portion of the vehicle and providing movement of the coverpart between the closed position covering the stowage space, a load opening position providing access to the stowage space from a rear end of the vehicle, and a passage opening position allowing movement of the top therethrough to the retracted position,
    wherein the movement mechanism includes:

a multi-link arrangement pivotally coupled to the cover part and extending therefrom;

a main member pivotally coupled to the vehicle at a main pivot, the main member having a neutral position corresponding with the cover part in the closed position, the main member being rotatable about the main pivot in opposite directions from the neutral position corresponding with the movement of the coverpart from the closed position toward the loading and passage opening positions, the main member being pivotally coupled to the multi-link arrangement at a pair of pivots that are overcenter with respect to the main pivot when the main member is in the neutral position to hold the main member in the neutral position and, in turn, the cover part in the closed position.

12. A motor vehicle as set forth in claim 11, wherein the movement mechanism includes a pair of drive members pivotally coupled to the main member at the pair of pivots.

13. A motor vehicle as set forth in claim 12, wherein the movement mechanism includes a pair of positioning levers pivotally coupled to the vehicle at respective pivots, each positioning lever having a first arm pivotally coupled to one of the drive members and a second arm pivotally coupled to the cover part.

14. A motor vehicle as set forth in claim 13, wherein the positioning levers are generally L-shaped.

15. A motor vehicle as set forth in claim 13, wherein the movement mechanism includes an intermediate lever having one end pivotally coupled to the second arm of one of the positioning levers and an opposite end directly pivotally coupled to the cover part.

16. A motor vehicle as set forth in claim 15, wherein the second arm of the other of the one of the positioning levers is directly pivotally coupled to the cover part.

17. A motor vehicle as set forth in claim 15, wherein the intermediate lever and the second aim of the one of the positioning levers are coupled by a pivot that is movable to an overcenter position to maintain the cover part in the passage opening position.

18. A motor vehicle as set forth in claim 13, wherein the main lever and positioning levers rotate in the same direction about the respective pivots during movement of the cover part between the closed position and the passage opening position.

19. A motor vehicle as set forth in claim 13, wherein the main lever and the positioning levers rotate in opposite directions during movement of the cover part between the closed position and the load opening position.

20. A motor vehicle as set forth in claim 13, wherein the main member and the positioning levers are pivotally coupled to a support bracket fixedly secured to the vehicle.

* * * * *

UNITED STATES PATENT AND TRADEMARK OFFICE
CERTIFICATE OF CORRECTION

| | | |
|---|---|---|
| PATENT NO. | : 7,806,458 B2 | Page 1 of 1 |
| APPLICATION NO. | : 11/815977 | |
| DATED | : October 5, 2010 | |
| INVENTOR(S) | : Stefan Meinert | |

It is certified that error appears in the above-identified patent and that said Letters Patent is hereby corrected as shown below:

Column 2, line 38: Replace "achieved it" with --achieved if--

Column 4, line 18: Replace "5 FIG" with --5 (FIG--

Column 8, line 10: Replace "aim" with --arm--

Signed and Sealed this
Eighth Day of March, 2011

David J. Kappos
*Director of the United States Patent and Trademark Office*